US012213453B2

(12) United States Patent
Rooda et al.

(10) Patent No.: US 12,213,453 B2
(45) Date of Patent: Feb. 4, 2025

(54) LIVESTOCK STILLBIRTHING ALERTING SYSTEM

(71) Applicant: SWINETECH, INC., Cedar Rapids, IA (US)

(72) Inventors: Matthew Rooda, New Sharon, IA (US); Abraham Espinoza, North Liberty, IA (US); John Rourke, Cedar Rapids, IA (US); Ben White, Cedar Rapids, IA (US); Adam Magstadt, Marion, IA (US)

(73) Assignee: SwineTech, Inc., Solon, IA (US)

( * ) Notice: Subject to any disclaimer, the term of this patent is extended or adjusted under 35 U.S.C. 154(b) by 556 days.

(21) Appl. No.: 17/288,704

(22) PCT Filed: Oct. 24, 2019

(86) PCT No.: PCT/US2019/057895
§ 371 (c)(1),
(2) Date: Apr. 26, 2021

(87) PCT Pub. No.: WO2020/086868
PCT Pub. Date: Apr. 30, 2020

(65) Prior Publication Data
US 2021/0400920 A1    Dec. 30, 2021

Related U.S. Application Data

(60) Provisional application No. 62/750,865, filed on Oct. 26, 2018.

(51) Int. Cl.
*A01K 29/00*    (2006.01)
*A61D 17/00*    (2006.01)
(Continued)

(52) U.S. Cl.
CPC .......... *A01K 29/005* (2013.01); *A61D 17/008* (2013.01); *G06T 7/0012* (2013.01);
(Continued)

(58) Field of Classification Search
CPC ..... G06T 7/00; G06T 7/0012; G06T 2207/00; G06T 2207/10016; G06T 2207/20;
(Continued)

(56) References Cited

U.S. PATENT DOCUMENTS

| 4,651,677 A | 3/1987 | de Wit |
| 5,228,449 A | 7/1993 | Christ |

(Continued)

FOREIGN PATENT DOCUMENTS

| CA | 2540832 | 9/2007 |
| CN | 202819238 | 3/2013 |

(Continued)

OTHER PUBLICATIONS

Silapachote P, Srisuphab A, Banchongthanakit W. An Embedded System Device to Monitor Farrowing. In2018 5th International Conference on Advanced Informatics: Concept Theory and Applications (ICAICTA) Aug. 14, 2018 (pp. 208-213). IEEE. (Year: 2018).*

(Continued)

*Primary Examiner* — Edward F Urban
*Assistant Examiner* — Duy Tran
(74) *Attorney, Agent, or Firm* — SHUTTLEWORTH & INGERSOLL, PLC; Jason R. Sytsma

(57) ABSTRACT

An image capture device with processors can execute a set of instructions stored in the system memory to: receive a plurality of time-sequenced images of the animal from the digital image sensor; determine, using an artificial intelligence module, a first birth in process from a first subset of images of the plurality of time-sequenced images of the (Continued)

animal; and determine an interval of time lapse between the first birth in process from the first subset of images of the plurality of time-sequenced images of the animal and a next birth in process from the next subset of images of the plurality of time-sequenced images of the animal, as determined using the artificial intelligence module, and when the interval of time lapse between the first birth in process and the next birth in process exceeds a predetermined amount trigger an action from an alert trigger.

15 Claims, 7 Drawing Sheets

(51) Int. Cl.
*G06T 7/00* (2017.01)
*G08B 21/18* (2006.01)

(52) U.S. Cl.
CPC .... *G08B 21/18* (2013.01); *G06T 2207/10016* (2013.01); *G06T 2207/20084* (2013.01)

(58) Field of Classification Search
CPC .......... G06T 2207/20084; G08B 21/18; G08B 21/02; A01K 29/00; A01K 29/005; A61D 17/00; A61D 17/006; A61D 17/008; A61D 19/00
See application file for complete search history.

(56) References Cited

U.S. PATENT DOCUMENTS

| | | | |
|---|---|---|---|
| 7,970,734 | B2 | 6/2011 | Townsend |
| 8,317,720 | B2 | 11/2012 | Laurence |
| 2002/0010390 | A1 | 1/2002 | Guice |
| 2006/0022723 | A1 | 2/2006 | Canada |
| 2008/0121168 | A1 | 5/2008 | Ryznar |
| 2009/0052692 | A1 | 2/2009 | Wang |
| 2010/0254558 | A1 | 10/2010 | Meyer |
| 2011/0224581 | A1* | 9/2011 | Cinti .................... A61D 17/006 600/588 |
| 2011/0290195 | A1* | 12/2011 | Labrecque .......... A01K 1/0218 119/508 |
| 2012/0108989 | A1 | 5/2012 | Gargiulo |
| 2012/0177229 | A1 | 7/2012 | Lorenz |
| 2012/0245933 | A1 | 9/2012 | Flaks |
| 2012/0321759 | A1* | 12/2012 | Marinkovich ......... A61B 5/442 356/402 |
| 2013/0073775 | A1* | 3/2013 | Wade .................... H04N 7/181 710/316 |
| 2014/0029808 | A1* | 1/2014 | Lee ........................ G06V 40/10 382/110 |
| 2014/0350351 | A1 | 11/2014 | Halperin |
| 2014/0350927 | A1 | 11/2014 | Yamabe |

FOREIGN PATENT DOCUMENTS

| | | | |
|---|---|---|---|
| CN | 103918604 | 7/2014 | |
| CN | 103999780 | 8/2014 | |
| CN | 104026029 | 9/2014 | |
| CN | 104026069 | 9/2014 | |
| CN | 203884379 | 10/2014 | |
| CN | 104366089 | 2/2015 | |
| CN | 204540277 | 8/2015 | |
| CN | 204695065 | 10/2015 | |
| CN | 204695066 | 10/2015 | |
| CN | 105285397 | 2/2016 | |
| CN | 105340826 | 2/2016 | |
| CN | 105341400 | 2/2016 | |
| CN | 205124689 | 4/2016 | |
| CN | 105594599 | 5/2016 | |
| CN | 205727542 | 11/2016 | |
| DE | 102013221266 | 4/2014 | |
| WO | 2008154662 | 12/2008 | |
| WO | 2014118788 | 8/2014 | |
| WO | 2015083153 | 6/2015 | |
| WO | WO-2016139323 A1 * | 9/2016 | .......... A01K 1/0218 |
| WO | WO-2017058893 A1 * | 4/2017 | .......... A01K 1/0218 |
| WO | 2020086868 | 4/2020 | |

OTHER PUBLICATIONS

Mexican Office Action dated Dec. 16, 2019 for counterpart Mexican Patent Application No. MX/a/2018/003163.
Canadian Office Action dated Nov. 12, 2019 for counterpart Canadian Patent Application No. 2,996,010.
Genzow et al., "Monitoring of a commercial fattening herd by means of the Pig Cough Monitor and oral fluid diagnostics", Jun. 8, 2014.
Mexican Office Action dated Jul. 9, 2019 for counterpart Mexican Application No. MX/a/2018/003163.
Canadian Office Action Issued Dec. 10, 2018 for counterpart Canadian Patent Application No. 2,996,010.
Ferrari S., et al.; "Cough sound analysis to identify respiratory infection in pigs", Computers and Electronics in Agriculture, Elsevier, Amsterdam, NL, vol. 64, No. 2, Dec. 2008, pp. 318-325.
International Search Report and Written Opinion, PCT/US2019/057895, dated Jan. 2, 2020, Blaine Copenheaver.

\* cited by examiner

LIVESTOCK STILLBIRTHING ALERTING SYSTEM

CROSS-REFERENCE TO RELATED APPLICATIONS

The present application is a national phase filing of international patent application PCT/US2019/057895, filed on Oct. 24, 2019 designating the U.S., which claims the benefit of U.S. Provisional Patent Application No. 62/750,865 filed Oct. 26, 2018, the contents of which is incorporated herein by reference.

TECHNICAL FIELD

The present invention relates to observation of animal birthing, and more particularly, the present invention relates to a system and method for anticipating and prevention of stillbirths.

BACKGROUND INFORMATION

The farrowing process is a critical time for both the mother and her new litter. For sows and piglets, for example, the health of the newborn piglets, there is a risk to the health of the sow and the litter when the birthing process is delayed or otherwise harmed by stillborns after delivery into the farrowing pen or before delivery by blocking the birthing of the rest of the litter.

The swine industry records as "stillborn" all piglets that are not alive when the farrowing attendant first finds the newly farrowed litter. Although this is how these stillborn piglets are recorded, it is an inaccurate classification. A true stillborn piglet is an animal that dies prior to farrowing. In the case of recorded stillborn piglets, standard convention s to record all piglets that are found dead at the completion of farrowing as stillborn, even though most of these piglets were alive when the farrowing process started.

Of these stillborn piglets, less than 10% are dead prior to farrowing. This means over 90 percent of these recorded stillborn piglets fall into one of two categories: 1) some of these piglets die in the process of exiting the birth canal, and need assistance to exit the canal; or 2) most "stillborn" piglets successfully exit the birthing canal but are born weak and die before the farrowing attendant finds them.

A sow can be at higher risk of having stillbirths due to age, genetics, health, stress and other factors; a measurement of these factors in the farrowing environment in combination with each sow's history of litter size, difficulty in farrowing, previous stillbirths and other metrics can be used to identify when and which sows are at higher risk of stillbirths, and need extra attention or intervention by an attendant as appropriate.

Other methods for still-birthing alerting use thermal or infrared (IR) to detect when a live birth has occurred. Those methods are deficient in that a thermal image has low resolution and cannot detect discoloration or other visual features of the mother and the newborn, which can give vital information as to the health and other biological information about the animals being observed.

Another method for still-birthing alerting uses a visual camera to identify when a newborn piglet has dropped from the birth canal and is a separate object through the use of edge detection, contour mapping, or other means of identifying separate objects. The deficiency with this method is that it is more prone to false positives from other recently born newborns walking near the birth canal exit, indicating a new birth when it has not actually occurred.

Accordingly, there is a need for a farrowing pen system and method that can detect or anticipate and prevent stillbirths through birthing detection and analysis of the sow's actions, the timing of those actions, or any other feature of the farrowing environment. This can help improve the viability and value of the individual animal as well as the entire litter, thereby leading to greater efficiency and profitability of the farrowing operation as a whole.

SUMMARY

In accordance with one aspect of the present invention, an animal parturition alerting and monitoring system is disclosed. The system can comprise an image capture device for capturing images of the animal during a parturition process, digital image sensor in communication with the image capture device, one or more processors in communication with the digital image sensor for processing images, and a system memory in communication with the one or more processors. The processors can execute a set of instructions stored in the system memory to: receive a plurality of time-sequenced images of the animal from the digital image sensor; determine, using an artificial intelligence module, a first birth in process from a first subset of images of the plurality of time-sequenced images of the animal; and determine an interval of time lapse between the first birth in process from the first subset of images of the plurality of time-sequenced images of the animal and a next birth in process from the next subset of images of the plurality of time-sequenced images of the animal, as determined using the artificial intelligence module, and when the interval of time lapse between the first birth in process and the next birth in process exceeds a predetermined amount trigger an action from an alert trigger. The system can also determine the interval between each preceding and subsequent birthing event. Otherwise it might seem that each birthing interval relates only back to the first birthing In one implementation, one or more sensors in communication with the one or more processors can be configured to detect temperature, sound, vibrations, and movement of the animal. In another implementation, the system determines the end of the birthing process by recognizing a placenta from a final subset of images of the plurality of time-sequenced images of the animal. In response to either a delay in a birth or the end of the birthing process, the system can trigger another action from the alert trigger to notify the producer or veterinarian.

The system can be enhanced in a number of manners. In one implementation, a UV light for illuminating the animal can be provided to receive a plurality of time-sequenced UV illuminated-images of the animal from the digital image sensor. In another implementation, a light filter corresponding to a background color of the animal is provided to increase fluorescence to receive a plurality of time-sequenced UV illuminated-images with an increased fluorescence from the digital image sensor. In another implementation, a polarization filter is provided to receive a plurality of time-sequenced UV illuminated and polarized images with an increased fluorescence from the digital image sensor. In other implementations, the operation of the system can be enhanced by not compressing the plurality of time-sequenced images and the image capture device is configured for capturing images in a visual spectrum of light.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
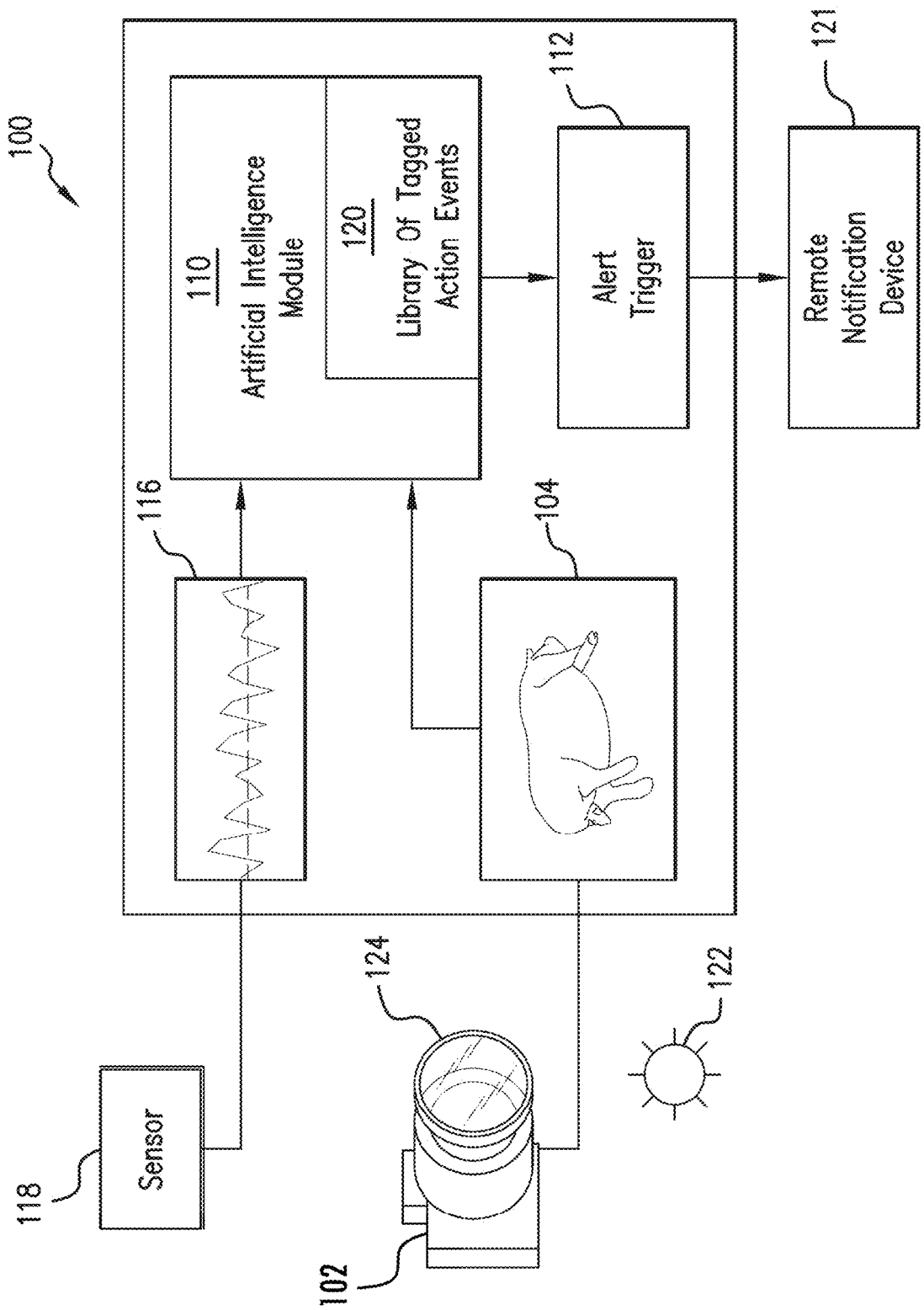
FIG. 1 is a schematic of an animal parturition alerting and monitoring system according to this disclosure.
Figure 2:
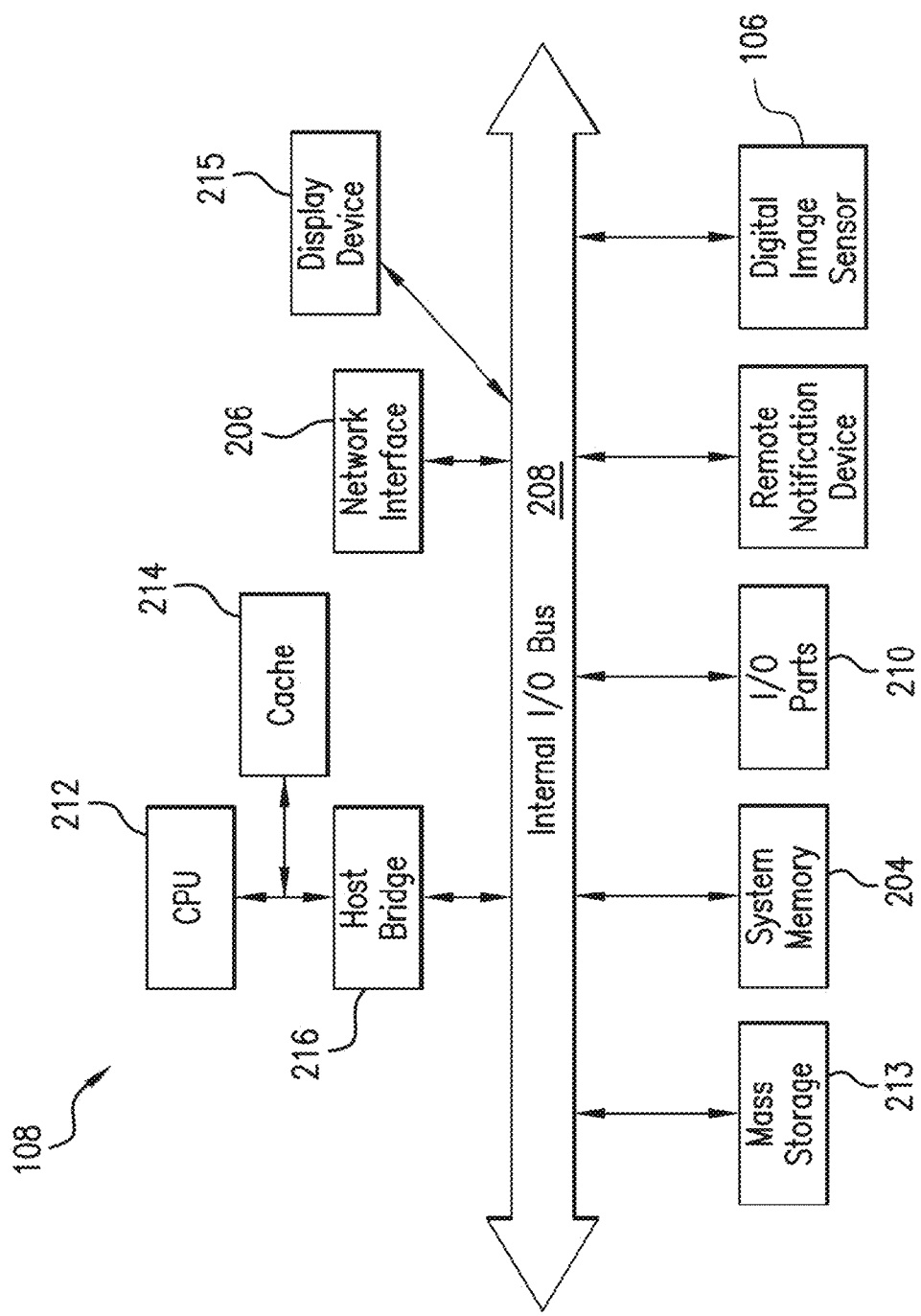
FIG. 2 is a functional block diagram illustrating hardware components of the processor for processing a series of images from an image detector incorporated into the system of FIG. 1.

Referring to FIG. 1, disclosed is an animal parturition alerting and monitoring system 100. System 100 incorporates an image capture device 102 for capturing images 104 of an animal 200 (shown in FIGS. 3-7) during parturition. System 100 continuously analyzes the incoming images 104 to determine and identify a birth-in-process and then calculates the time interval between successive births-in-process and, if the interval exceeds a pre-determined amount, warn the producer or veterinarian of a complication or, if successfully completed, notify the same. System 100 can detect or anticipate and prevent stillbirths through detection and analysis of the animal's actions and the timing of those actions to improve the viability and value of each individual animal as well as the entire litter, thereby leading to greater efficiency and profitability of the farrowing operation as a whole A computing system 108 is shown in FIG. 2. Computing system 108 can be a standalone system or incorporated into image capture device 102. Computing system 108 can receive digital representations of images 104 from image capture device 102 from a digital image sensor 106. Digital image sensor 106 communicates with one or more processors 212 and a system memory 204. Processor 212 can be included in the same housing as digital image sensor 106 or communicatively coupled as a separate system. A set of instructions can be stored in system memory 204 and executable locally by one or more processors 212. This instruction set can receive a plurality of time-sequenced images 104 of animal 200 from digital image sensor 106. From these images 104, computing system 108 can determine, using an artificial intelligence module 110 (shown in FIG. 1), a first birth in process from a first subset of images 104 of the plurality of time-sequenced images 104 of the animal. From this subset, system 100 can determine an interval of time lapse between the first birth in process from the first subset of images 104 of the plurality of time-sequenced images 104 of animal 200 and a next birth in process from the next subset of images 104 of the plurality of time-sequenced images of animal 200, as determined using artificial intelligence module 110. When the interval of time lapse between the first birth in process and the next birth in process exceeds a predetermined amount, system 100 can trigger an action from an alert trigger 112.

To carry out the analysis described in system 100, a machine learning analysis program may be used. In such an implementation, system 100 can determine from at least one characteristic of image 104 of a birth in process. System 100 shows a machine learning analysis algorithm comprising the foregoing instructions that are executable on one or more processors 212. System 100 and related methods are described below as being used by system 100. System 100 can receive and process one or both of a signals 116 and images 104.

Accordingly, images 104 are recorded continuously and provided to an artificial intelligence (AI) module 110, also referred to as a machine learning or machine intelligence module. AI module 110 may include a neural network (NN), e.g., a convolutional neural network (CNN), trained to determine whether there is a birth in process. Any suitable AI method and/or neural network may be implemented, e.g., using known techniques. For example, a fully convolutional neural network for image recognition (also sound or other signal recognition) may be implemented using the TensorFlow machine intelligence library.

AI module 110 includes a library of pre-recorded births in process and non-birthing event. Within this library, each individual image 104 is tagged to identify and tag the point in time of a birth in process to create library of tagged action events 120. AI module 110 uses this library of tagged action events 120 to compare in real-time images 104 that are recorded continuously and provided to artificial intelligence (AI) module 110. From this comparison, the neural network may provide a confidence level with respect to its determination that a birth in process is occurring. In other words, one or more processors 212 comprising AI module 110 is in communication with image capture device 102 and is configured for determining from images 104 a birth in process and for determining from library of tagged action events 120.

AI module 110 can also include a library of pre-recorded action events of other types of signals such as vibratory, temperature, and health-data signals, which can be categorized to form a library. In this regard, system 100 can use one or more sensors 118 to detect and record vibratory signals 708 from the mother. Sensor 118 can be a microphone, laser, accelerometer, strain gauge or other type of vibratory sensor that responds to acoustic pressure or vibration created by the animal. Within each library, each individual signal 1160 is tagged to identify and tag a relevant data point for library of tagged action events 120. AI module 110 uses this library of tagged action events 120 to compare in real-time signals 116 from one or more sensors 118 that are recorded continuously and provided to an artificial intelligence (AI) module 110. From this comparison, the neural network may provide a confidence level with respect to its determination that an event is occurring indicative of a birth in process. In other words, one or more processors 212 comprising AI module 110 is in communication with such sensors 118 and is configured for determining from at least one data point of such signals 116 a possible birth in process and for determining from a library of action events, which can be in the form of the tagged action events 120, a likely birth in process.

Figure 3:
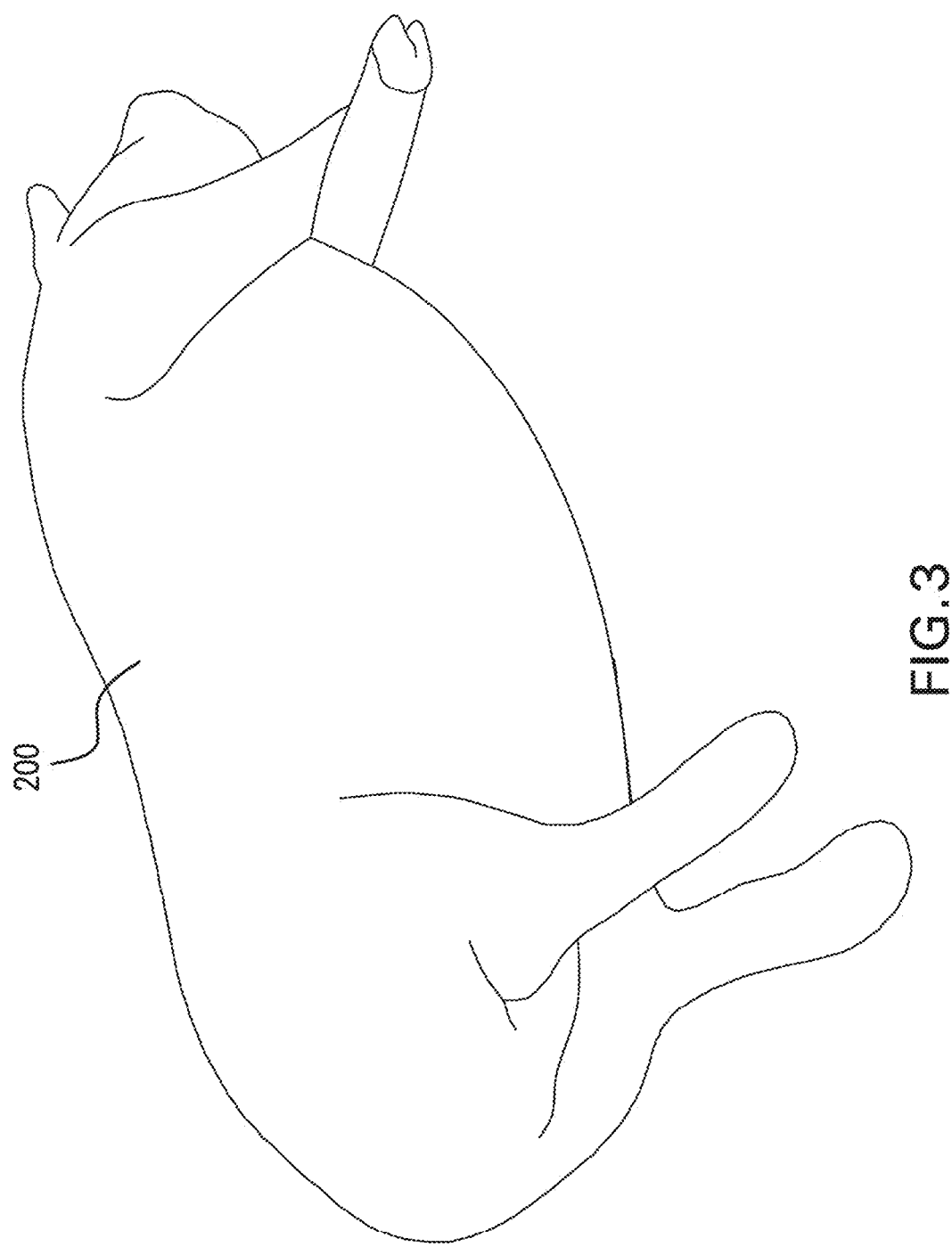
FIG. 3 is an image of an animal processed by the system of FIG. 1.
Figure 4:
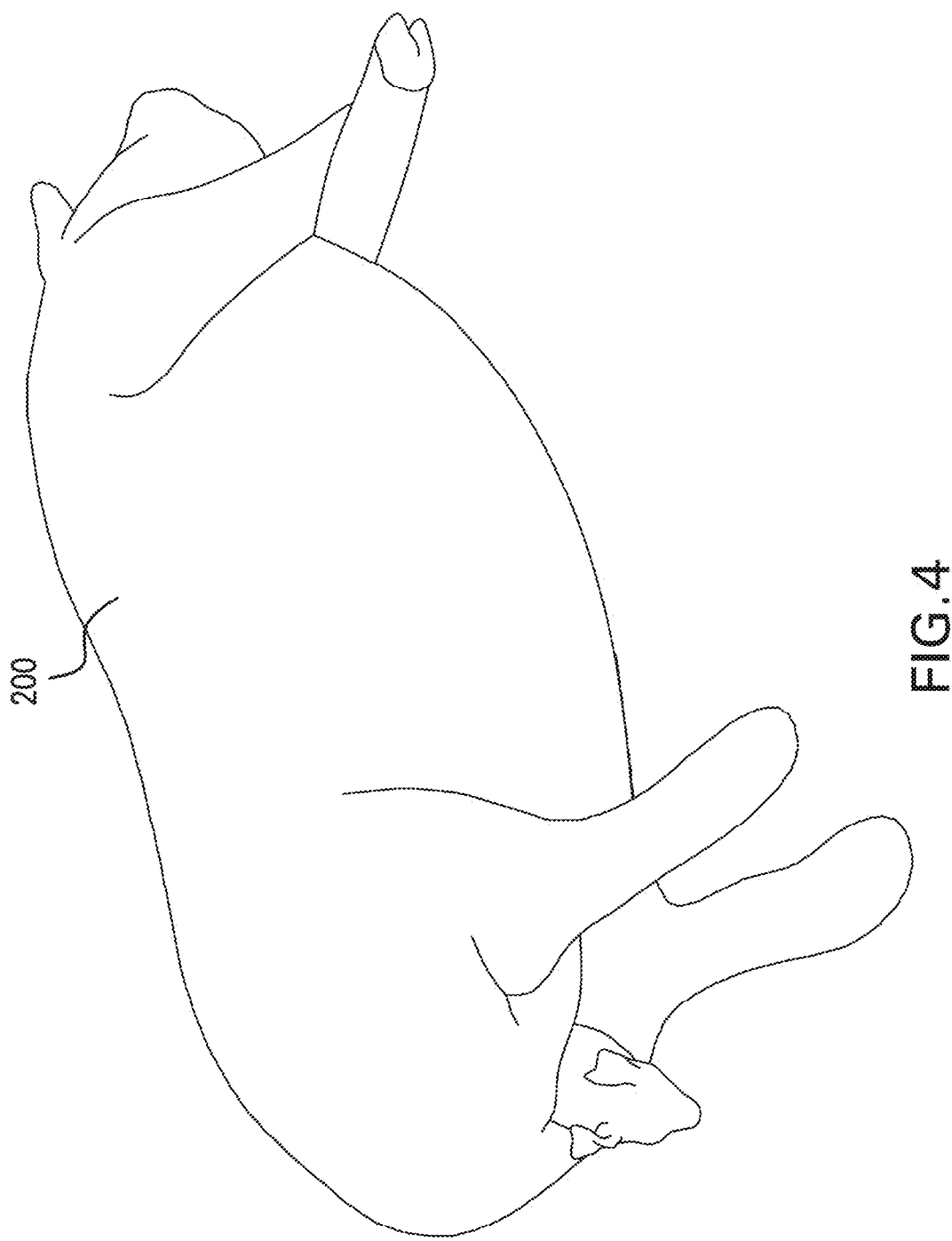
FIG. 4 is another image of a birth in process that is processed by the system of FIG. 1.
Figure 5:
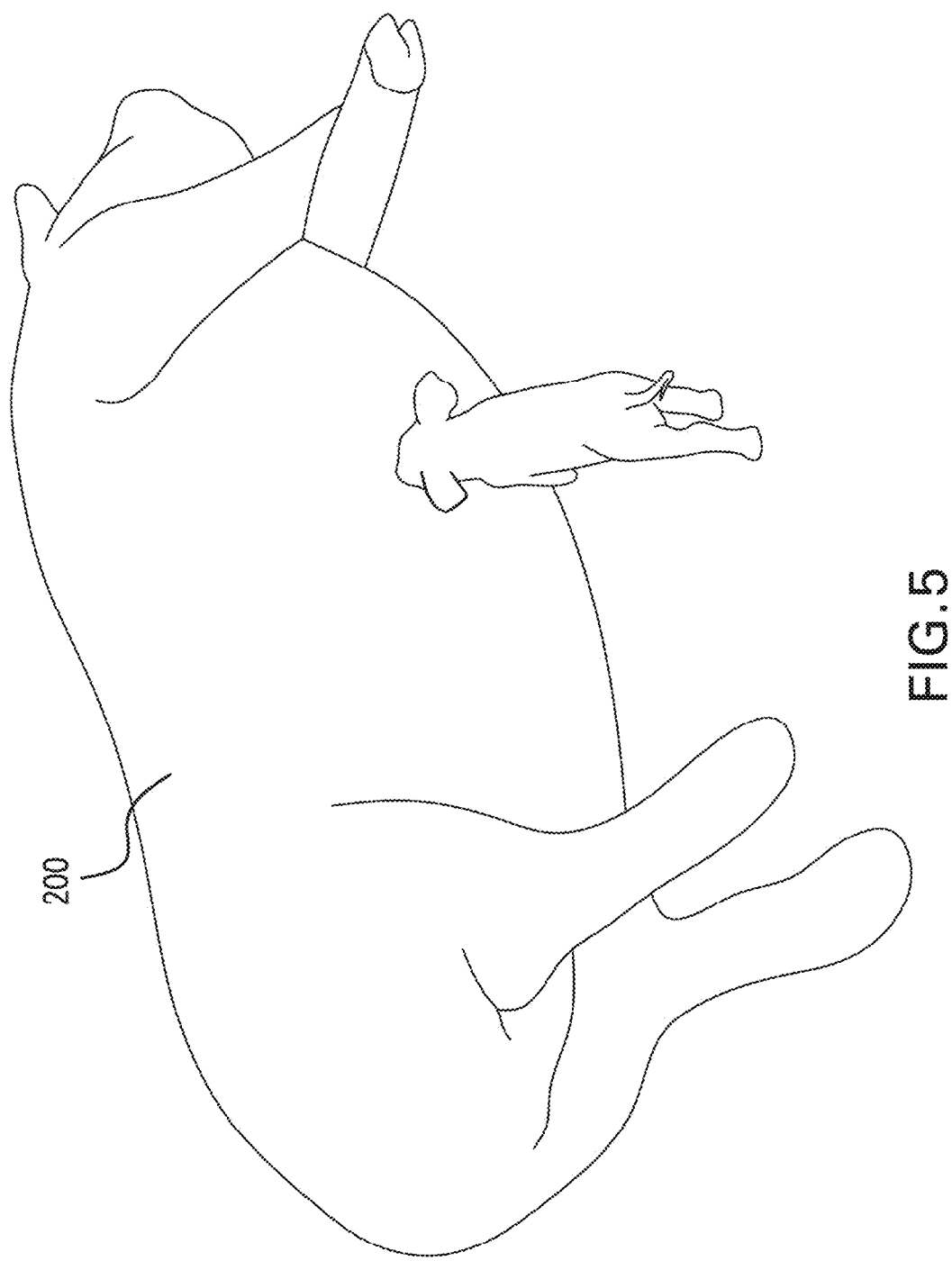
FIG. 5 is another image of the animal after delivering the first piglet that is processed by the system of FIG. 1.
Figure 6:
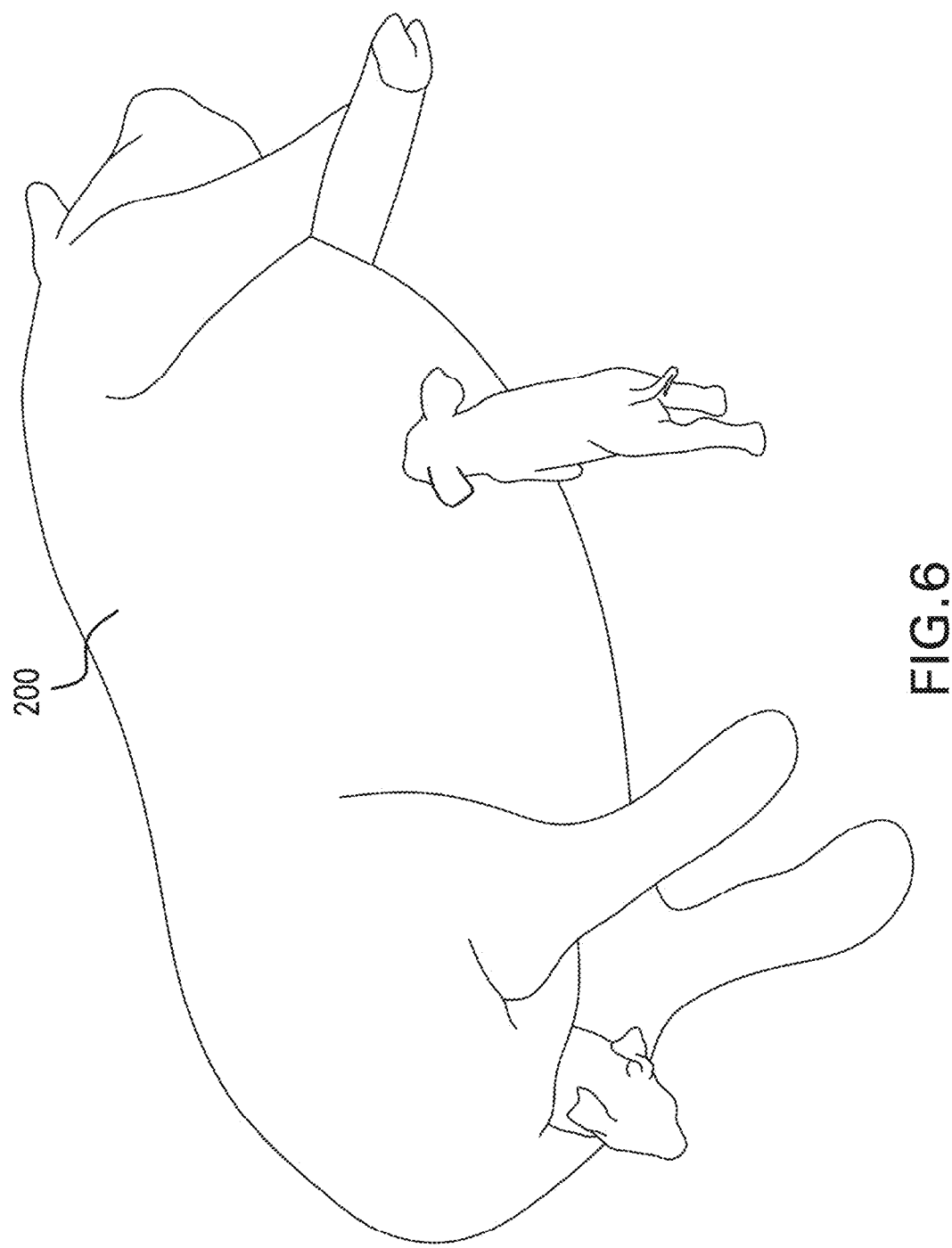
FIG. 6 is another image of a birth in process that is processed by the system of FIG. 1.
Figure 7:
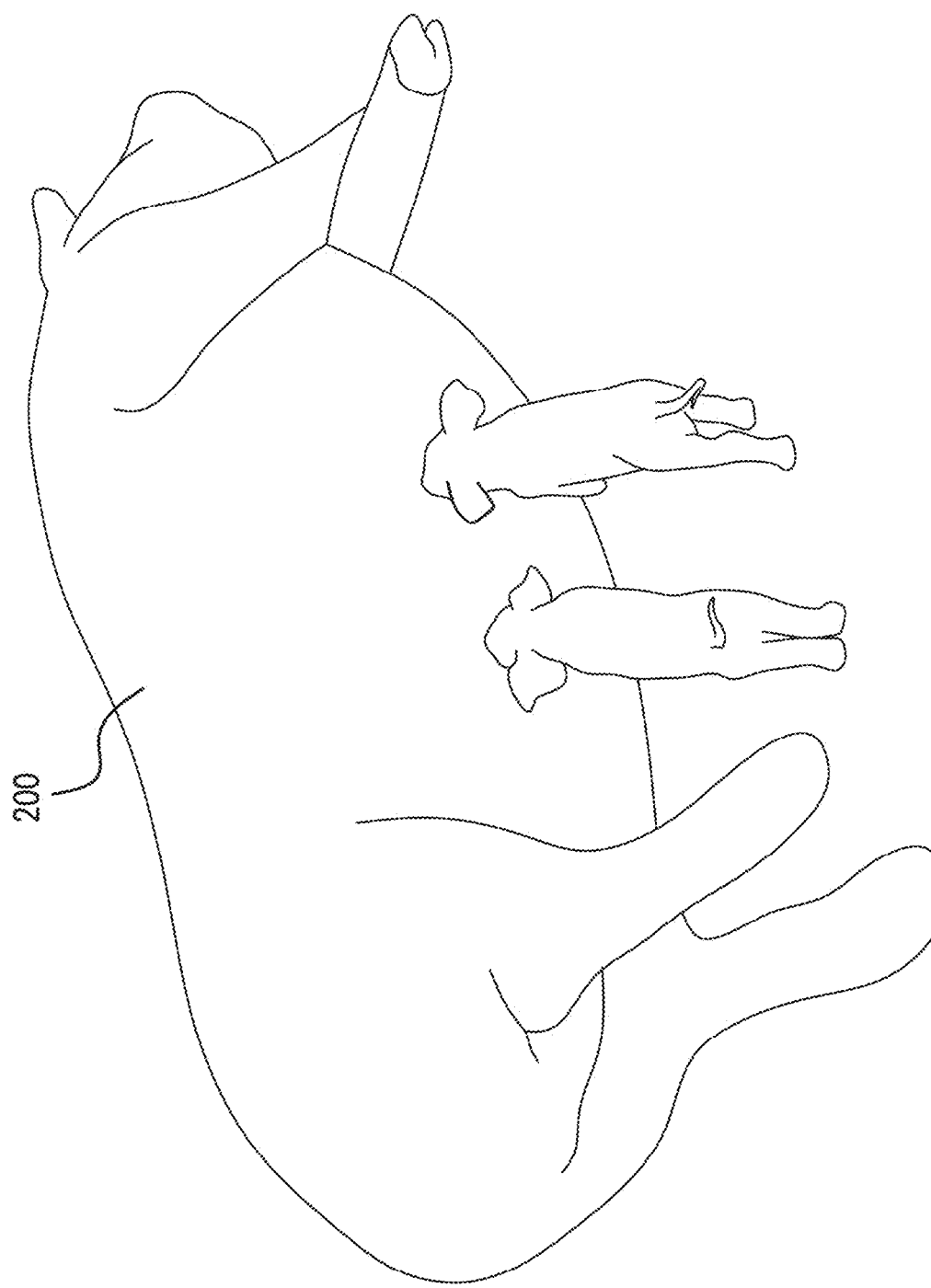
FIG. 7 is another image of the animal after delivering a subsequent piglet that is processed by the system of FIG. 1.

FIGS. 3-7 show exemplary images 104 analyzed by AI module 110. FIG. 3 shows image 104 of animal prior to the beginning of delivery. FIG. 4 is another image 104 showing a birth in process. FIG. 5 is another image 104 after delivering the first piglet. FIG. 6 is image 104 of a birth in process of another piglet. FIG. 7 is image 104 of the animal after delivering a subsequent piglet. Images 104 shown in FIGS. 3-7 are exemplary plurality of time-sequenced images of the animal from digital image sensor 106 of image capture device 102. From a subset of such images 104, AI module 110 can determine a birth in process and when there is not a birth in process. AI module 110 can also determine when parturition is complete by detecting the placenta discharged from the animal.

AI module 110 is trained with time-sequenced images. In one implementation, AI module 110 is trained by monitoring for signs of the beginning of a birth in process for each litter. A technician can initiate to AI module 110 through a physical, electronic, or software indication (such as a physical, electronic, or software switch) to begin recording time-sequenced images from a stream. A buffer continuously and temporarily stores time-sequenced images. At the initiation, AI module 110 can begin storing in system memory 204 time-sequenced images from a predetermined period of time before the initiation from the buffer and continue streaming data from buffer until thirty minutes after the last birthing, as determined by the technician. The technician can also tag during the stream when individual births (or stillbirths) have occurred and when the litter farrowing has completed as indicated by the expelling of the placenta. This manual tagging of time-sequenced images is expected to have some variation in timing, so a training set of multiple births in process will provide a more accurate determination of the beginning and ending of each birth in process or stillbirth (and the intervals between them).

The database in which library of tagged action events 120 is stored can be a relational database such as PostGres along with an image store such as AWS S3. The metadata in the database can store information about each image 104, including image ID, birth/no birth, birth stage, time, lighting, location, birth anomalies. The visual data stream making up time-sequenced images 104 can be further reviewed before and after the manually-input tag of each birth in process and add another tag indicating the exact frame where the image should be considered a birth in process or stillbirth in progress, as well as the exact frame that should be considered the last birth. On completion of a farrowing series, all related records of that farrowing (filename, time, date, sow identification, duration of parturition, number of births and stillbirths, tag indices and classifications and any other relevant information) can be grouped together and saved in mass storage 213 or system memory 204 for safekeeping and later upload and/or analysis.

As can be seen from images 104 in the foregoing figures, image capture device 102 and digital image sensor 106 is operable for capturing images in the visual spectrum (i.e. the portion of the electromagnetic spectrum that is visible to the human eye) using raw, uncompressed images to reduce error rates and improve accuracy. Generally, this is in the wavelengths of 380-740 nanometers. AI module 110 can be enhanced by providing a UV light source 122, such as black light which operates in the UV-A spectrum. Bodily fluids such as amniotic fluid, vaginal fluid, and blood are naturally fluorescent and will glow under the presence of UV light. The efficiency and accuracy of AI module 110 can be enhanced with UV illuminated images 104.

The efficiency and accuracy of AI module 110 can be further enhanced with one or more filters 124. One or more filters 124 can include light filters that correspond with the color of the background or the animal. By filtering out background light, AI module 110 can be enhanced with images 104 that enhance a birth in process from background noise. Polarization filters can be provided to further enhance images 104, for example, by removing glare from images 104.

In the manner described above, AI module 110 can similarly be used for monitoring and detecting changes in the animal's respiration, movement, coughing, or sounds that may be indicative of an increased likelihood of stillbirths. AI module 110 can monitor and detect changes in weight or the presence of any prolapse, sores or infection on the body especially near the vagina. AI module 110 can monitor and detect changes in the fecal quantity or quality, such as changes in color, consistency, indications of diarrhea or constipation. AI module 110 can monitor and detect changes in condition or behavior of newborns, such as scours (diarrhea), weak or strong movement, trembling, piling, huddling, ability or inability to nurse. AI module 110 can monitor and detect changes in the number of piglets in the litter, number of mummies and other stillbirths, duration of each birthing event, or the total duration of farrowing. All of this information gathered and analyzed by AI module 110 can be used to determine the health of the animal or identify any health or life threatening events. All of this is done by categorizing in library of tagged action events 120 events that correspond with the foregoing and non-events to train AI module 110 to detect the same in manner previously described.

As time passes a variety of data will be collected, including but not limited to birth order, birth size, nursing duration and patterns, sleep duration and patterns, litter size, skin temperature, vocalizations and general activity levels (exercise) as well as other biological or behavior metrics that can be collected through the identification of the animal in conjunction with visual, thermal, auditory or any other types of sensor that can acquire information about a specific animal or the litter of animals and their environment. Additional software can be used to aid in further analysis in a self-learning environment to continually and incrementally improve system 100.

Referring back to FIG. 2, shown exemplary computing platform for executing the processing function necessary to derive, calculate, and perform the above functions that are described as being carried out on processor 212. In one implementation, processor 212 comprises a system memory 204, network interface 206 and one or more software applications and drivers enabling or implementing the methods and functions described herein. Hardware system includes a standard I/O bus 208 with I/O Ports 210 and mass storage 213 (which can also be a non-volatile Flash Memory) coupled thereto or external or cloud-based storage, such as the Google or Amazon cloud services. Bridge 216 couples processors 212 to I/O bus 208. The hardware system may further include video memory and display device 215 coupled to the video memory. These elements are intended to represent a broad category of computer hardware systems, including but not limited to general-purpose computer systems based on the Pentium processor manufactured by Intel Corporation of Santa Clara, Calif., as well as any other suitable processor.

Elements of the computer hardware system perform their conventional functions known in the art. In particular, network interface 206 is used to provide communication between processors 212 and Ethernet networks (or any other network or external device). Mass storage 213 can be provided and used to provide permanent storage for the data and programming instructions to perform the above-described functions implementing the test to be carried, whereas system memory 204 (e.g., DRAM) is used to provide temporary storage for the data and programming instructions when executed by processors 212. I/O ports 210 are one or more serial and/or parallel communication ports used to provide communication between additional peripheral devices, such as digital image sensor 106 and sensors 118.

Computing system 108 may include a variety of system architectures, and various components of processors 212 may be rearranged. For example, cache 214 may be on-chip with processors 212. Alternatively, cache 314 and processors 212 may be packed together as a "processor module," with processors 212 being referred to as the "processor core." Furthermore, certain implementations of the claimed embodiments may not require nor include all the above components. Also, additional components may be included, such as additional processors, storage devices, or memories.

The foregoing described alert trigger 112 can be in the form of alerting a remote notification device 121 carried by the producer or veterinarian of an increased likelihood of a stillbirth from either the interval between births in process exceeding a predetermined amount of time. Most piglets, for example, are delivered every 15-20 minutes, but can occur faster or slower. If the interval between piglets is longer than 30-45 minutes, then the sow or gilt needs to be evaluated to see if she is having difficulty having her piglets. If the interval exceeds 20-50 minutes or (any value in between), alert trigger 112 can be triggered to send an alert to remote notification device 121. Remote notification device 121 can be a mobile device or pager. In one implementation, an alert signal goes out over the network to cause a text message or phone call to the appropriate response person.

Those skilled in the art will recognize that the technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:

1. An animal parturition alerting and monitoring system, the system comprising:
    an image capture device for capturing images of the animal during a parturition process, a digital image sensor in communication with the image capture device, one or more processors in communication with the digital image sensor for processing images, and a system memory in communication with the one or more processors;
    a set of instructions stored in the system memory and executable locally by the one or more processors to:
    receive a plurality of time-sequenced images of the animal from the digital image sensor;
    determine, using an artificial intelligence module, a first birth in process from a first subset of images of the plurality of time-sequenced images of the animal; and
    determine an interval of time lapse between the first birth in process from the first subset of images of the plurality of time-sequenced images of the animal and a next birth in process from the next subset of images of the plurality of time-sequenced images of the animal, as determined using the artificial intelligence module, and when the interval of time lapse between the first birth in process and the next birth in process exceeds a predetermined amount trigger an action from an alert trigger; and
    one or more sensors in communication with the one or more processors configured to detect vibratory signals from the animal, wherein the artificial intelligence module of the processor associates detected vibratory signals with an action event from the interval of time lapse between the first birth in process and the next birth in process exceeding the predetermined amount and based upon such association providing a confidence level with respect to the artificial intelligence module's determination that an action event is occurring indicative of a birth in process.

2. The system of claim 1, wherein the plurality of time-sequenced images are uncompressed.

3. The system of claim 1, wherein the image capture device is configured for capturing images in a visual spectrum of light.

4. The system of claim 1, wherein the image capture device is elevated above the animal.

5. The system of claim 1, wherein the image capture device is aligned with the animal.

6. The system of claim 1, wherein from the set of instructions stored in the memory of the digital image sensor and executable locally by the one or more processors to determine, using the artificial intelligence module, a placenta from a final subset of images of the plurality of time-sequenced images of the animal.

7. The system of claim 6, wherein from the set of instructions stored in the memory of the digital image sensor and executable locally by the one or more processors to trigger another action from the alert trigger.

8. The system of claim 1, and further comprising a UV light for illuminating the animal and wherein the set of instructions stored in the memory of the digital image sensor and executable locally by the one or more processors is configured to receive a plurality of time-sequenced UV illuminated-images of the animal from the digital image sensor.

9. The system of claim 8, and further comprising a light filter corresponding to a background color of the animal to increase a fluorescence and wherein the set of instructions stored in the memory of the digital image sensor and executable locally by the one or more processors is configured to receive a plurality of time-sequenced UV illuminated-images with an increased fluorescence from the digital image sensor.

10. The system of claim 9, and further comprising a polarization filter, and wherein the set of instructions stored in the memory of the digital image sensor and executable locally by the one or more processors to receive a plurality of time-sequenced UV illuminated and polarized images with an increased fluorescence from the digital image sensor.

11. An animal parturition alerting and monitoring system, the system comprising:

an image capture device configured to capture images of a pregnant animal;

at least one biometric sensor chosen from temperature, sound, vibrations, and movement for capturing biometric data about the animal;

a processor configured to receive and analyze the images and data to determine a likelihood of a stillbirth; and a remote notification device configured to provide information relating to the biometric data and the images to a user, wherein the processor further comprises an artificial intelligence module, and wherein the processor receives a plurality of time-sequenced images of the animal from the image capture device; determines, using the artificial intelligence module, a first birth in process from a first subset of images of the plurality of time-sequenced images of the animal and determines an interval of time lapse between the first birth in process from the first subset of images of the plurality of time-sequenced images of the animal and a next birth in process from the next subset of images of the plurality of time-sequenced images of the animal, as determined using the artificial intelligence module, and when the interval of time lapse between the first birth in process and the next birth in process exceeds a predetermined amount of time and a confidence level trigger an action from an alert trigger to the remote notification device, wherein the confidence level is derived by the artificial intelligence module of the processor from associating the biometric data about the animal with the predetermined amount of time.

12. The system of claim 11, wherein the plurality of time-sequenced images are uncompressed, and wherein the image capture device is configured for capturing images in a visual spectrum of light.

13. The system of claim 11, wherein from a set of instructions stored in a system memory of an image capture device and executable locally by the one or more processors to determine, using the artificial intelligence module, a placenta from a final subset of images of the plurality of time-sequenced images of the animal.

14. The system of claim 11, and further comprising: a UV light for illuminating the animal and wherein the plurality of time-sequenced images are UV illuminated-images of the animal from the digital image sensor; a light filter corresponding to a background color of the animal to increase a fluorescence and wherein the set of instructions stored in the memory of the digital image sensor and executable locally by the one or more processors to receive a plurality of time-sequenced UV illuminated-images with an increased fluorescence from the digital image sensor; and a polarization filter, and wherein the set of instructions stored in the memory of the digital image sensor and executable locally by the one or more processors to receive a plurality of time-sequenced UV illuminated and polarized images with an increased fluorescence from the digital image sensor.

15. The system of claim 11, wherein the alert trigger is configured to provide a notification to the remote notification device.

* * * * *